L. M. RHODES.
COTTON-PLANTER.

No. 172,776. Patented Jan. 25, 1876.

WITNESSES:
E. Wolff
Aly F. Roberts

INVENTOR:
L. M. Rhodes
BY
Munn
ATTORNEYS.

UNITED STATES PATENT OFFICE.

LEONIDAS M. RHODES, OF WARRENTON, GEORGIA.

IMPROVEMENT IN COTTON-PLANTERS.

Specification forming part of Letters Patent No. 172,776, dated January 25, 1876; application filed October 29, 1875.

Figure 1:
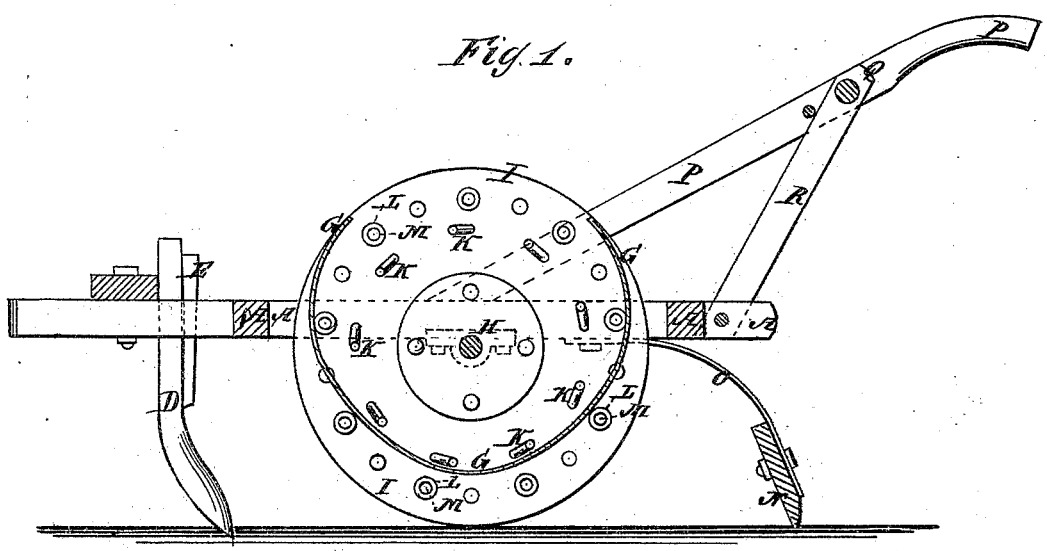
Figure 2:
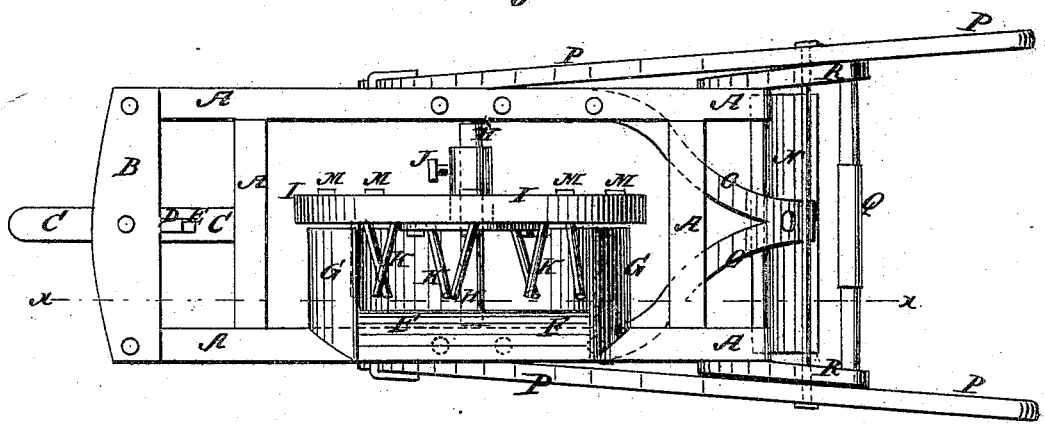

To all whom it may concern:

Be it known that I, LEONIDAS M. RHODES, of Warrenton, in the county of Warren and State of Georgia, have invented a new and useful Improvement in Cotton-Planter, of which the following is a specification:

Figure 1 is a vertical longitudinal section of my improved planter taken through the line $x\,x$, Fig. 2. Fig. 2 is a top view of the same.

Similar letters of reference indicate corresponding parts.

My present invention is an improvement upon the machine for which I obtained Letters Patent No. 113,797. In said machine the seed is discharged through a slot in the bottom of the hopper. I have, however, found that a better result may be attained by constructing the hopper without a slot, and providing the traveling-wheel with pins or fingers inclined rearward, so as to draw the seed toward the side of the wheel and deliver it through the space between the hopper and wheel, as hereinafter set forth.

The frame A B of the machine is rectangular in shape, and provided with handles P, which are connected by round Q and supported by standard R. A furrow-opener, D, is secured in a slot of bar C by means of a key, E, and a seed-coverer, N, is attached to the rear end of the machine by spring-arms O. In respect to these parts of the machine I claim nothing new.

The seed-hopper is composed of a cylinder, G, which is cut out at the top, and open on the side next the wheel I, the other side being formed by a disk, F. In other words, the wheel forms one side of the hopper, but the former is so set or adjusted on the shaft H that a sufficient space is left between the hopper and wheel to permit the discharge of seed. This space can be widened or narrowed, at will, by adjusting the wheel on the shaft H by means of screw J. A series of fingers or pins, K, project in a circle from the face or inner side of the wheel I, and each is inclined toward the left from a line drawn radially through its base, so that they will work or move the seed laterally and rearward into the slot or space between the wheel and edge of the hopper. The wheel I travels on the ground, and hence constantly rotates as the machine is drawn forward. The hopper is arranged eccentric to the shaft H, so that the pins K pass over the bottom thereof as the wheel revolves.

A concentric row of seed-cups, L, is located near the periphery of the wheel. These cups are provided with screws M for gaging or regulating their cubical capacity.

I claim—

The combination of the wheel I, provided with a series of teeth or fingers, K, inclined as specified, and the hopper having a closed bottom, as shown and described, whereby the seed is discharged between the wheel and hopper, as set forth.

LEONIDAS M. RHODES.

Witnesses:
JEPTHA M. CODY,
JOHN R. SWAIN.